United States Patent

Tojyo

[11] 4,283,123
[45] Aug. 11, 1981

[54] MICROSCOPE OBJECTIVE

[75] Inventor: Tsutomu Tojyo, Hachiouji, Japan

[73] Assignee: Olympus Optical Co., Ltd., Tokyo, Japan

[21] Appl. No.: 70,493

[22] Filed: Aug. 28, 1979

Related U.S. Application Data

[63] Continuation of Ser. No. 829,574, Aug. 3, 1977, abandoned.

[30] Foreign Application Priority Data

Sep. 7, 1976 [JP] Japan ............................. 51-107081

[51] Int. Cl.³ .......................... G02B 9/60; G02B 21/02
[52] U.S. Cl. ................................... 350/414; 350/468
[58] Field of Search ................ 350/175 ML, 176, 219

[56] References Cited

U.S. PATENT DOCUMENTS 3,537,773  11/1970  Klein ........................... 350/219 X
3,575,495   4/1971  Tibbetts ........................ 350/219

Primary Examiner—Conrad J. Clark
Assistant Examiner—Scott J. Sugarman
Attorney, Agent, or Firm—Cushman, Darby & Cushman

[57] ABSTRACT

A microscope objective comprising a first, second, third fourth and fifth lenses, in which the first lens is a positive lens, the second lens is a positive meniscus lens, the third lens is a negative lens, the fourth lens is a positive meniscus lens and the fifth lens is a positive lens, and satisfying the following conditions for which the number of lenses constituting the lens system is small, working distance is large and resolving power is extremely high.

(1) $0.14f < d_3 < 0.5f$ (2)
$0.28f < |r_2| < 0.69f$
$0.28f < |r_8| < 0.69f$ (3) $0.5 < r_4/r_3 < 2.7$
(4) $0.4d_4 < d_5/n_3 + d_6 + d_7/n_4 < 2.5d_4$
(5) $\nu_3 < 35, \nu_1 > 50, n_1 > 1.60$

4 Claims, 4 Drawing Figures

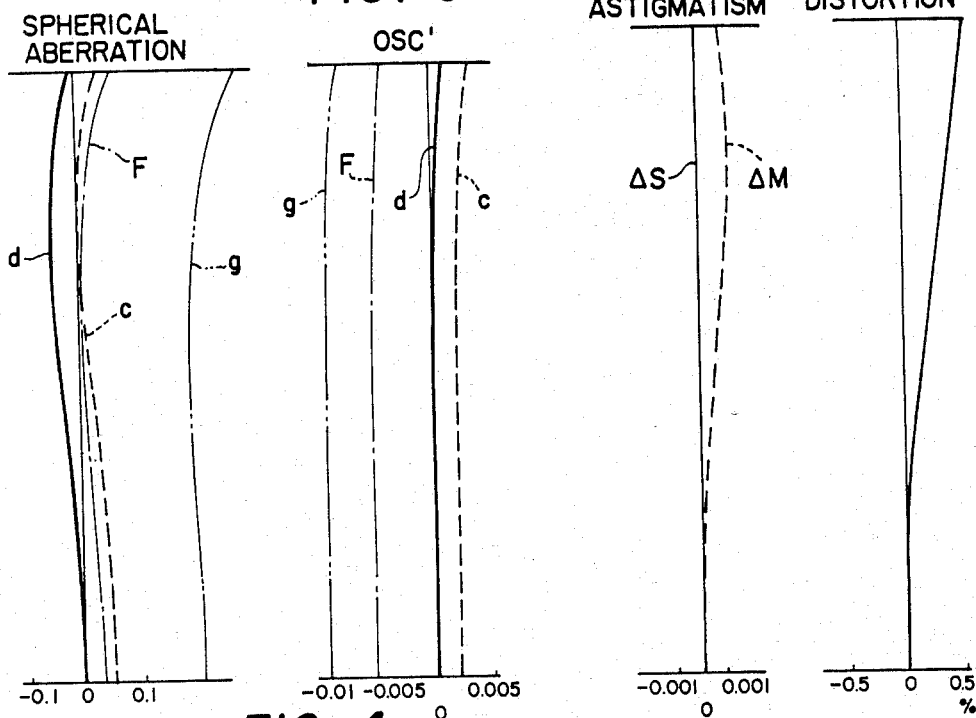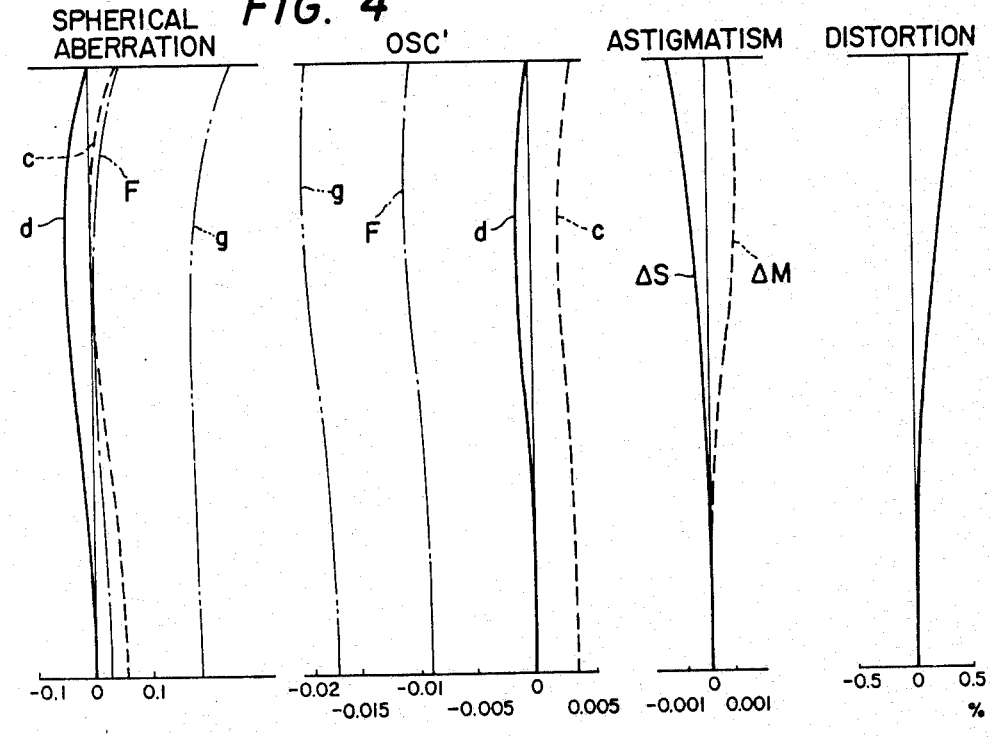

MICROSCOPE OBJECTIVE

This is a continuation of application Ser. No. 829,574 filed Aug. 31, 1977, now abandoned.

BACKGROUND OF THE INVENTION (a) Field of the Invention

The present invention relates to a microscope objective and, more particularly, to a microscope objective with low magnification.

(b) Description of the Prior Art

Known microscope objectives with low magnification have disadvantages that the number of lenses constituting the lens system becomes large and the working distance becomes short when it is attempted to obtain favourable flatness of image. Besides, for known microscope objectives, it is impossible to obtain really satisfactory resolving power. It is considered that the cause of unsatisfactory resolving power is that especially spherical aberration becomes large in the intermediate field angle.

SUMMARY OF THE INVENTION

It is, therefore, a primary object of the present invention to provide a microscope objective with low magnification for which the number of lenses constituting the lens system is comparatively small, the working distance is large, flatness of image is favourable and, at the same time, resolving power is made more favourable by preventing spherical aberration from becoming large in the intermediate field angle.

The microscope objective according to the present invention has lens configuration as shown in FIG. 1. It comprises five lenses. i.e., the first lens, second lens, third lens, fourth lens and fifth lens from the object side in which the first lens is a positive lens, the second lens is a positive meniscus lens arranged convex toward the object side, the third lens is a negative lens, the fourth lens is a positive meniscus lens arranged concave toward the object side, and the fifth lens is a biconvex lens. Besides, the microscope objective according to the present invention satisfies the following conditions when reference symbol f represents the focal length of the lens system as a whole, reference symbol $r_2$ represents the radius of curvature of the surface on the image side of the first lens, reference symbols $r_3$ and $r_4$ respectively represent radii of curvature of respective surfaces of the second lens, reference symbol $r_8$ represents the radius of curvature of the surface on the image side of the fourth lens, reference symbols $d_3$, $d_5$ and $d_7$ respectively represent thicknesses of the second, third and fourth lenses, reference symbol $d_4$ represents the airspace between the second and third lenses, reference symbol $d_6$ represents the airspace between the third and fourth lenses, reference symbols $n_1$, $n_3$ and $n_4$ respectively represent refractive indices of the first, third and fourth lenses, and reference symbols $\nu_1$ and $\nu_3$ respectively represent Abbe's numbers of the first and third lenses.

(1) $0.14f < d_3 < 0.5f$
(2) $0.28f < |r_2| < 0.69f$  $0.28f < |r_8| < 0.69f$
(3) $0.5 < r_4/r_3 < 2.7$
(4) $0.4d_4 < d_5/n_3 + d_6 + d_7/n_4 < 2.5d_4$
(5) $\nu_3 < 35$, $\nu_1 > 50$, $n_1 > 1.60$

Out of the above conditions, the condition (1) is to define the thickness of the second lens. If the thickness $d_3$ becomes smaller than 0.14f in the condition (1), coma will be aggravated considerably. If $d_3$ becomes larger than 0.5f, it will be impossible to correct spherical aberration in well-balanced state.

If, in the condition (2), the radius of curvature $|r_2|$ of the surface on the image side of the first lens becomes smaller than 0.28f, spherical aberration will be overcorrected. If $|r_2|$ becomes larger than 0.69f, the astigmatic difference will increase. If the radius of curvature $|r_8|$ of the surface on the image side of the fourth lens becomes smaller than 0.28f, spherical aberration and coma will be aggravated. If $|r_8|$ becomes larger than 0.69f, coma will be aggravated.

The condition (3) relates to correction of lateral chromatic aberration. For microscope objectives with high magnification, it is difficult to correct lateral chromatic aberration favourably. Therefore, microscope objectives are generally designed so that lateral chromatic aberration is left to some extent and it is corrected by the eyepiece. Therefore, microscope objectives with low magnification are also designed by leaving an adequate amount of lateral chromatic aberration so that the left lateral chromatic aberration is favourably corrected by the eyepiece. The microscope objective according to the present invention is also arranged so that an adequate amount of lateral chromatic aberration is caused. For this purpose, radii of curvature of respective surfaces of the second lens are arranged so that their ratio satisfies the condition (3). If $r_4/r_3$ in the condition (3) becomes smaller than 0.5, lateral chromatic aberration will become too large. If $r_4/r_3$ becomes larger than 2.7, lateral chromatic aberration will become too small and this is not preferable due to the reason described in the above.

If, in the condition (4), $d_5/n_3 + d_6 + d_7/n_4$ becomes smaller than $0.4d_4$, lateral chromatic aberration will become smaller that that of microscope objectives with high magnification. Besides, coma will be considerably aggravated. If the above value becomes larger than $2.5d_4$, spherical aberration will be considerably aggravated. Especially, the airspace $d_6$ has large influence on spherical aberration.

The condition (5) is established for the purpose of making Petzval's sum and spherical aberration favourable by taking lateral chromatic aberration into consideration. If it becomes $\nu_3 > 35$ or $\nu_1 < 50$, spherical aberration will be undercorrected. If it becomes $n_1 < 1.60$, Petzval's sum will become unfavourable and flatness of image will be disturbed. Besides, the fact that the material of the first lens is selected as defined by the condition (5) is effective also for correcting astigmatism favourably.

BRIEF DESCRIPTION OF THE DRAWINGS

FIG. 3 shows graphs illustrating aberration curves of Embodiment 2; and

FIG. 4 shows graphs illustrating aberration curves of Embodiment 3.

DETAILED DESCRIPTION OF THE PREFERRED EMBODIMENTS

Figure 1:
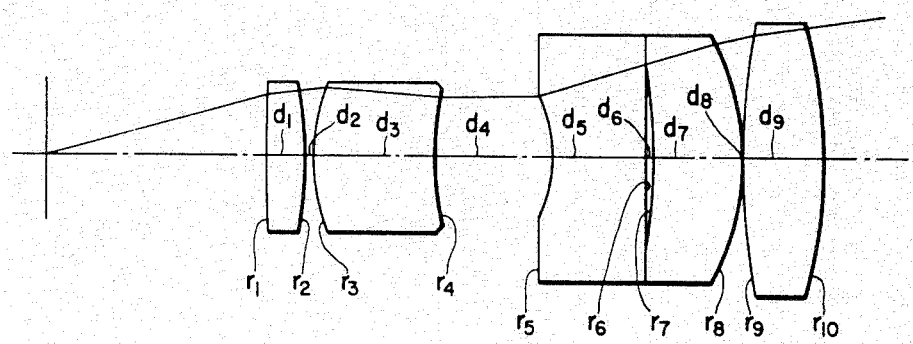
FIG. 1 shows a sectional view of the microscope objective according to the present invention.
Figure 2:
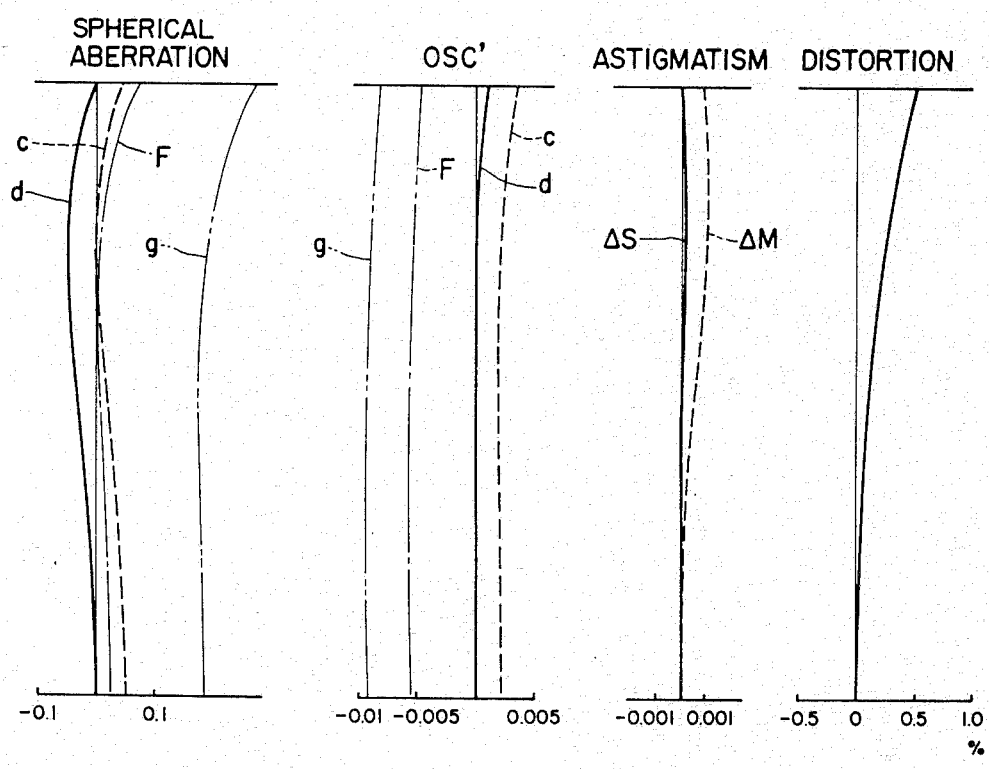
FIG. 2 shows graphs illustrating aberration curves of Embodiment 1 of the microscope objective according to the present invention.

Preferred embodiments of the microscope objective according to the present invention explained in the above are as shown below.

Embodiment 1

$f = 1.0$  N.A $= 0.25$  $\beta = -10x$
W.D $= 0.4301$  Petzval's sum $= 0.08$ $r_1 = 4.1434$
  $d_1 = 0.0746$  $n_1 = 1.69680$  $\nu_1 = 56.51$
$r_2 = -0.4743$
  $d_2 = 0.0143$
$r_3 = 0.5249$
  $d_3 = 0.3206$  $n_2 = 1.64000$  $\nu_2 = 60.09$
$r_4 = 0.4530$
  $d_4 = 0.1118$
$r_5 = -0.2344$
  $d_5 = 0.2546$  $n_3 = 1.80518$  $\nu_3 = 25.43$
$r_6 = \infty$
  $d_6 = 0.0098$
$r_7 = -1.6090$
  $d_7 = 0.1680$  $n_4 = 1.61800$  $\nu_4 = 63.38$
$r_8 = -0.5059$
  $d_8 = 0.0046$
$r_9 = 4.2799$
  $d_9 = 0.1393$  $n_5 = 1.65830$  $\nu_5 = 57.33$
$r_{10} = -0.7544$ Embodiment 2

$f = 1.0$  N.A $= 0.25$  $\beta = -10x$
W.D $= 0.4288$  Petzval's sum $= 0.08$ $r_1 = 3.5764$
  $d_1 = 0.0743$  $n_1 = 1.69680$  $\nu_1 = 56.51$
$r_2 = -0.4819$
  $d_2 = 0.0143$
$r_3 = 0.5175$
  $d_3 = 0.3205$  $n_2 = 1.61700$  $\nu_2 = 62.79$
$r_4 = 0.4467$
  $d_4 = 0.1176$
$r_5 = -0.2324$
  $d_5 = 0.2520$  $n_3 = 1.80518$  $\nu_3 = 25.43$
$r_6 = \infty$
  $d_6 = 0.0172$
$r_7 = -1.6598$
  $d_7 = 0.1485$  $n_4 = 1.61800$  $\nu_4 = 63.38$
$r_8 = -0.5082$
  $d_8 = 0.0046$
$r_9 = 5.9089$
  $d_9 = 0.1357$  $n_5 = 1.69680$  $\nu_5 = 56.51$
$r_{10} = -0.7362$ Embodiment 3

$f = 1.0$  N.A $= 0.25$  $\beta = -10x$
W.D $= 0.3967$  Petzval's sum $= 0.223$ $r_1 = -3.2204$
  $d_1 = 0.0709$  $n_1 = 1.69680$  $\nu_1 = 56.51$
$r_2 = -0.4784$
  $d_2 = 0.0174$
$r_3 = 0.3908$
  $d_3 = 0.1429$  $n_2 = 1.64000$  $\nu_2 = 60.09$
$r_4 = 0.8743$
  $d_4 = 0.4047$
$r_5 = -0.2118$
  $d_5 = 0.1537$  $n_3 = 1.80518$  $\nu_3 = 25.43$
$r_6 = \infty$
  $d_6 = 0.0073$
$r_7 = -0.5729$
  $d_7 = 0.1696$  $n_4 = 1.62299$  $\nu_4 = 58.14$
$r_8 = -0.4024$
  $d_8 = 0.0043$
$r_9 = 2.5943$
  $d_9 = 0.1479$  $n_5 = 1.64250$  $\nu_5 = 58.37$
$r_{10} = -0.6401$ In the above embodiments, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

I claim:

1. A microscope objective comprising a first, second, third, fourth and fifth lenses, said first lens being a positive lens, said second lens being a positive meniscus lens arranged convex toward the object side, said third lens being a negative lens, said fourth lens being a positive meniscus lens arranged concave toward the object side, said fifth lens being a biconvex lens, each of said lens components being a single lens with an air space between each pair of said lens components, and said microscope objective satisfying the following conditions:

$0.47f < r_2 < 0.49f$
$0.4f < r_8 < 0.51f$ wherein reference symbol $f$ represents the focal length of the lens system as a whole, reference symbol $r_2$ represents the radius of curvature of the surface on the image side of the first lens, and reference symbol $r_8$ represents the radius of curvature of the surface on the image side of the fourth lens.

2. A microscope objective according to claim 1, in which said microscope objective has the following numerical data:

$f = 1.0$  N.A $= 0.25$  $\beta = -10x$
W.D $= 0.4301$  Petzval's sum $= 0.08$ $r_1 = 4.1434$
  $d_1 = 0.0746$  $n_1 = 1.69680$  $\nu_1 = 56.51$
$r_2 = -0.4743$
  $d_2 = 0.0143$
$r_3 = 0.5249$
  $d_3 = 0.3206$  $n_2 = 1.64000$  $\nu_2 = 60.09$
$r_4 = 0.4530$
  $d_4 = 0.1118$
$r_5 = -0.2344$
  $d_5 = 0.2546$  $n_3 = 1.80518$  $\nu_3 = 25.43$
$r_6 = \infty$
  $d_6 = 0.0098$
$r_7 = -1.6090$
  $d_7 = 0.1680$  $n_4 = 1.61800$  $\nu_4 = 63.38$
$r_8 = -0.5059$
  $d_8 = 0.0046$
$r_9 = 4.2799$
  $d_9 = 0.1393$  $n_5 = 1.65830$  $\nu_5 = 57.33$
$r_{10} = -0.7544$ 3. A microscope objective according to claim 1, in which said microscope objective has the following numerical data:

$f = 1.0$  N.A $= 0.25$  $\beta = -10x$
W.D $= 0.4288$  Petzval's sum $= 0.08$ $r_1 = 3.5764$
  $d_1 = 0.0743$  $n_1 = 1.69680$  $\nu_1 = 56.51$
$r_2 = -0.4819$
  $d_2 = 0.0143$
$r_3 = 0.5175$
  $d_3 = 0.3205$  $n_2 = 1.61700$  $\nu_2 = 62.79$
$r_4 = 0.4467$
  $d_4 = 0.1176$
$r_5 = -0.2324$
  $d_5 = 0.2520$  $n_3 = 1.80518$  $\nu_3 = 25.43$
$r_6 = \infty$
  $d_6 = 0.0172$
$r_7 = -1.6598$
  $d_7 = 0.1485$  $n_4 = 1.61800$  $\nu_4 = 63.38$
$r_8 = -0.5082$
  $d_8 = 0.0046$
$r_9 = 5.9089$
  $d_9 = 0.1357$  $n_5 = 1.69680$  $\nu_5 = 56.51$ -continued $r_{10} = -0.7362$ 4. A microscope objective according to claim 1, in which said microscope objective has the following numerical data:

| | | |
|---|---|---|
| f = 1.0 | N.A = 0.25 | β = −10x |
| W.D = 0.3967 | | Petzval's sum = 0.223 |

$r_1 = -3.2204$
  $d_1 = 0.0709$  $n_1 = 1.69680$  $\nu_1 = 56.51$
$r_2 = -0.4784$
  $d_2 = 0.0174$

-continued $r_3 = 0.3908$
  $d_3 = 0.1429$  $n_2 = 1.64000$  $\nu_2 = 60.09$
$r_4 = 0.8743$
  $d_4 = 0.4047$
$r_5 = -0.2118$
  $d_5 = 0.1537$  $n_3 = 1.80518$  $\nu_3 = 25.43$
$r_6 = \infty$
  $d_6 = 0.0073$
$r_7 = -0.5729$
  $d_7 = 0.1696$  $n_4 = 1.62299$  $\nu_4 = 58.14$
$r_8 = -0.4024$
  $d_8 = 0.0043$
$r_9 = 2.5943$
  $d_9 = 0.1479$  $n_5 = 1.64250$  $\nu_5 = 58.37$
$r_{10} = -0.6401$

* * * * *